July 25, 1944.   L. P. CLARK   2,354,576
LAWN MOWER TRAILER
Filed Dec. 12, 1942   2 Sheets-Sheet 1
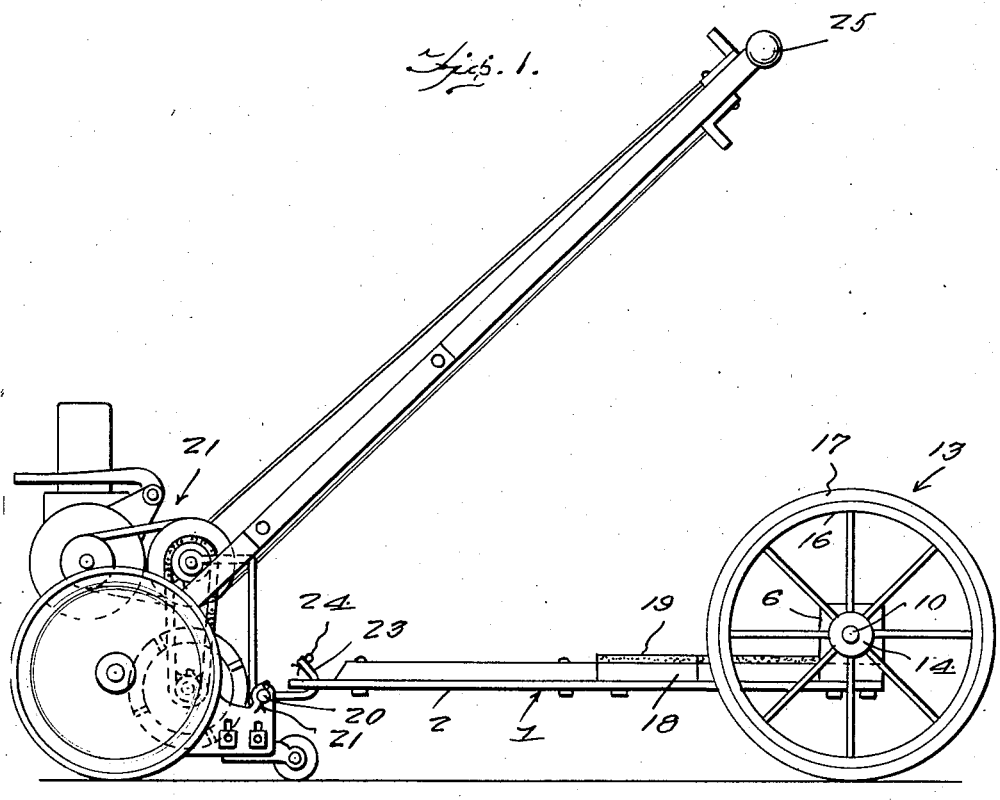
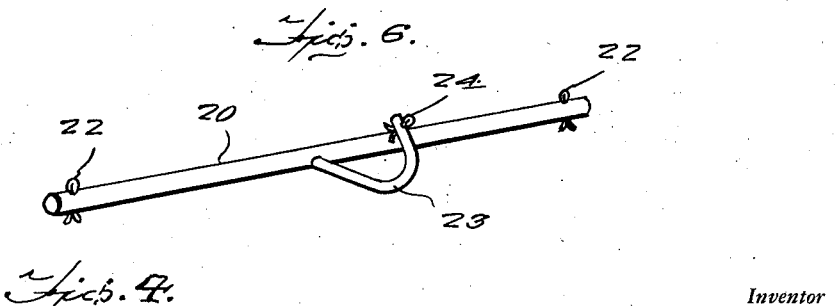
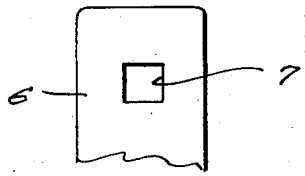
Inventor
Lewis Percy Clark
By Clarence A. O'Brien
and Harvey B. Jacobson
Attorney July 25, 1944.                L. P. CLARK                2,354,576
                          LAWN MOWER TRAILER
                     Filed Dec. 12, 1942         2 Sheets-Sheet 2
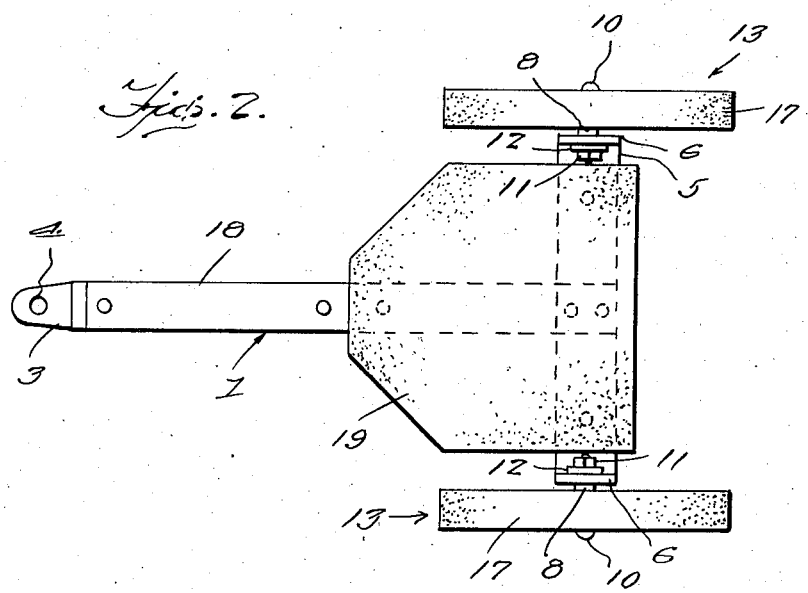
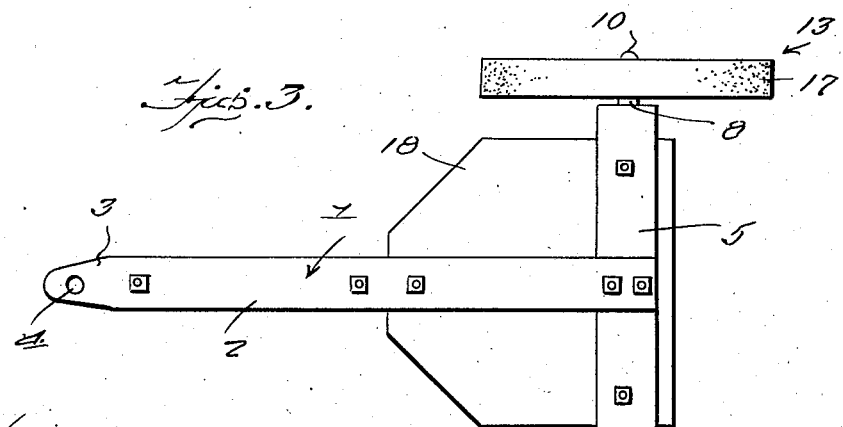
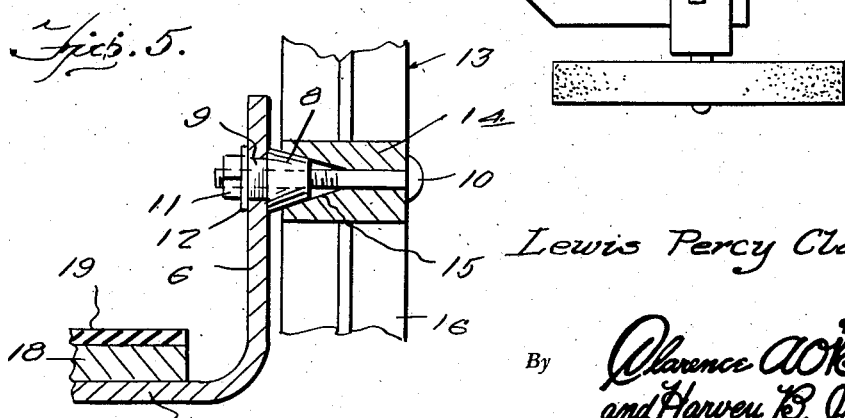
Inventor
Lewis Percy Clark
By Clarence A. O'Brien
and Harvey B. Jacobson
Attorneys Patented July 25, 1944

2,354,576

UNITED STATES PATENT OFFICE 2,354,576

LAWN MOWER TRAILER

Lewis Percy Clark, Hampton, N. H.

Application December 12, 1942, Serial No. 468,809

1 Claim. (Cl. 280—33.4)

The present invention relates to new and useful improvements in trailers for power driven law mowers, and has for its primary object to provide, in a manner as hereinafter set forth, an attachment whereby the operator may ride behind the mower.

Another very important object of the invention is to provide a trailer of the aforementioned character which is adapted to be expeditiously attached to a conventional power driven lawn mower without the necessity of making material structural alterations in said mower.

Still another very important object of the invention is to provide a trailer attachment for power driven lawn mowers comprising novel means for mounting the supporting wheels on the device.

Other objects of the invention are to provide a lawn mower trailer which will be comparatively simple in construction, strong, durable, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation, showing a trailer constructed in accordance with the present invention attached to a power driven lawn mower.

Figure 2 is a top plan view of the trailer.

Figure 3 is a bottom plan view.

Figure 4 is a fragmentary view in elevation, showing an end portion of the transverse frame member.

Figure 5 is a vertical sectional view through one of the wheel mountings.

Figure 6 is a perspective view of the draw bar or rod.

Referring now to the drawings in detail, it will be seen that the embodiment of the invention which has been illustrated comprises a frame which is designated generally by reference numeral 1. The frame 1 includes a longitudinal tongue 2 in the form of a flat metallic bar which terminates in a tapered forward end portion 3 having an opening 4 therein. The frame 1 further includes a cross member 5 in the form of a flat metallic bar which terminates in upturned end portions 6 having square openings 7 therein.

Mounted on the outer sides of the upstanding members 6 are cones 8. The cones 8 comprise square heads, 9 on one end which are engaged in the openings 7. Extending through and threaded in the cones 8 and the heads 9 thereof are spindles 10 in the form of bolts. A nut 11 is threaded on the inner end portions of each spindle 10. Washers 12 are interposed between the nuts 11 and the upstanding end portions 6 of the cross member 5. The nuts 11 and washers 12 retain the heads 9 of the cones 8 in the openings 7 and the nuts 11 prevent the spindles 10 from rotating.

Supporting wheels 13 are mounted on the spindles 10. The wheels 13 include hubs 14, the bores of which comprise conical inner end portions 15 which accommodate the cones 8. By turning the spindles 10 in the cones 8 and heads 9, the end portions 15 of the cores may be drawn onto the cones 8 and thus adjusted on the spindles 10 to compensate for wear. By tightening the nuts 11, the spindles 10 may be locked against turning. The wheels 13 further include flat rims 16 having tires 17 mounted thereon.

Rigidly secured on the frame structure 1 is a platform 18 of suitable material, preferably wood. A rubber mat 19 is mounted on the platform 18.

A draw bar is mounted transversely on the rear of a power driven lawn mower 21. Cotter pins 22 in the end portions of the draw bar 20 removably secure said draw bar in position on the mower. Projecting from the draw bar 20 at an intermediate point is a hook 23 which is engageable in the opening 4 of the tongue 2 for detachably connecting the trailer to the mower 21. A cotter pin 24 prevents accidental disengagement of the tongue 2 from the hook 23.

It is thought that the manner in which the attachment functions will be readily apparent from a consideration of the foregoing. Of course, the wheels 13 support the rear end of the trailer, while the forward end thereof is supported by the mower 21. The operator stands on the platform 18 where he may conveniently grip the handle 25 of the mower. As the mower travels over the ground, the trailer is drawn behind it. The hook connection 23 permits the mower to be readily turned as desired.

It is believed that the many advantages of a lawn mower trailer constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

A trailer for power driven lawn mowers comprising a horizontal frame structure including a longitudinal tongue for attachment to a mower, said frame structure further including a cross member comprising upturned end portions, stationary cones mounted on said upturned end portions, spindles extending through said cones, supporting wheels having hubs journaled on the spindles and the cones, the spindles being endwise adjustable in the cones into different set positions to adjust said hubs toward said cones to take up wear in said hubs.

LEWIS PERCY CLARK.